J. W. CRUIKSHANK.
SUPPLYING AND GRADING SAND TO GLASS GRINDING MACHINES.
APPLICATION FILED DEC. 18, 1918.

1,343,711.  Patented June 15, 1920.
2 SHEETS—SHEET 1.

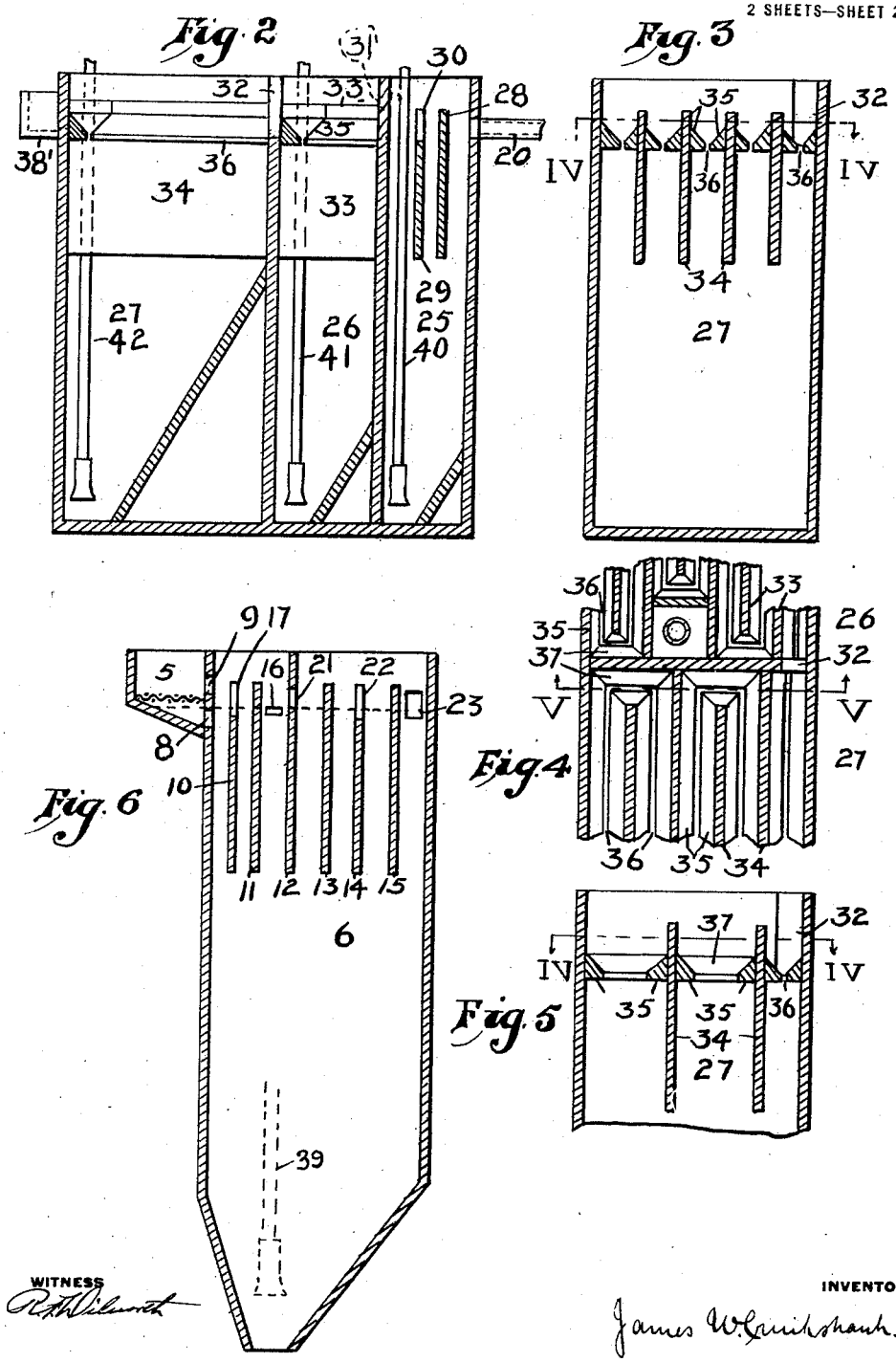

UNITED STATES PATENT OFFICE.

JAMES W. CRUIKSHANK, OF PITTSBURGH, PENNSYLVANIA, ASSIGNOR TO J. W. CRUIKSHANK ENGINEERING COMPANY, OF PITTSBURGH, PENNSYLVANIA.

SUPPLYING AND GRADING SAND TO GLASS-GRINDING MACHINES.

1,343,711. Specification of Letters Patent. Patented June 15, 1920.

Application filed December 18, 1918. Serial No. 267,364.

*To all whom it may concern:*

Be it known that I, JAMES W. CRUIKSHANK, a citizen of the United States, resident of Pittsburgh, county of Allegheny, State of Pennsylvania, have invented a new and useful Improvement for Supplying and Grading Sand to Glass-Grinding Machines, of which the following is a full and exact description, accompanied by drawings which form a part of this specification.

The invention has for its object the simplification of apparatus for supplying and grading abrasive to glass grinding machines and more particularly to obtain positive results in the graduation of the different and successively finer grades of sand by means of a horizontal flow of water. In general principle the primary grader used in this apparatus is the same as shown in my co-pending application Serial No. 129,262.

It has been found that in a mixture of sand and water the coarser sand will settle out very rapidly from the water and will fall to the bottom of a vessel. The speed of settling varies directly as the weight of the grain and inversely as the area of its surface. It is therefore apparent that with grains of material of the same specific gravity the speed of their settlement will be in a ratio of geometrical progression to their diameters or linear dimensions. Thus the larger grains will be deposited very rapidly and will not be carried any appreciable distance by a horizontal flow, the smaller grains will be held in suspension for a longer time and carried a considerable distance, the finest material will be held in suspension, some of it almost indefinitely, and will not settle in a reasonable length of time. This lighter material is not useful for grinding purposes and is carried away to the sewer.

In order to produce an effective horizontal grader, one of two principles or both combined must be employed. The first is to give the water carrying the abrasive a comparatively short length of travel to deposit the heavier particles of abrasive, the length of travel for the mixture being relatively increased to produce each succesively finer grade of abrasive. The second is to relatively increase the cross sectional area of the channel through which the water carrying the abrasive flows so as to successively cause a more sluggish flow of water and diminish its carrying capacity for the successively finer grades of abrasive. I have embodied these principles in practice in my apparatus by providing a comparatively short travel for the liquid charged with the coarser abrasive which is rapidly deposited. As the grading progresses the collecting chambers become larger in area and the liquid has a greater distance to travel. I further employ the principle of enlarging the area of the canals so that a slower rate of flow is obtained through them than through the canals where the coarser abrasive is deposited. As the volume of water passing through the inlet or outlet is the same, it is evident that the rate of flow in the larger canals is slower and more sluggish, and the rate of flow per unit area of the stream will be proportionate to the area of the total stream at that point, or in other words the size of the canal through which the stream is flowing.

Referring to the drawings:

Fig. 2 is a sectional elevation on line II—II, Fig. 1.

Fig. 3 is a vertical section on line III—III, Fig. 1.

Fig. 4 is a partial horizontal section on line IV—IV, Fig. 3 or Fig. 5.

Fig. 5 is a sectional elevation on line V—V, Fig. 4.

Fig. 6 is a vertical section taken on line VI—VI, Fig. 1.

Figure 1:
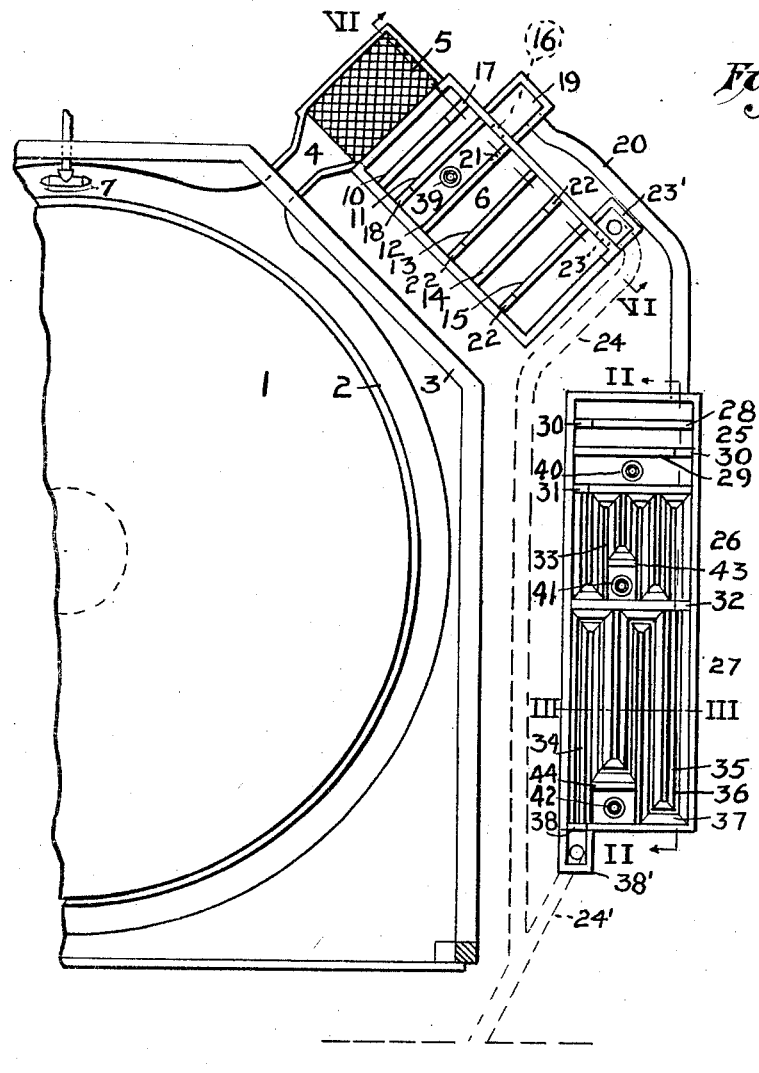
Figure 1 is a plan view of the apparatus.

The numeral 1 represents the circular disk of the glass grinding machine provided with the usual bridge and runners which are not shown. The machine is surrounded by the ditch 2 inside of fence 3 for collecting the abrasive and water thrown off by the machine, having an outlet 4 to a screen 5 leading to a pit 6. The ditch is provided with a water supply pipe 7 to assist in washing the abrasive from the ditch. The pit 6 has an inlet 8 for the water passing through the screen and also an inlet 9 above the screen through which the water can pass in case of the screen becoming clogged up with plaster and other foreign matter. Pit 6 is divided by downwardly extending partitions 10, 11, 12, 13, 14 and 15 forming canals intercommunicating at their lower ends. Partitions 10 and 11 are provided with depressed openings 17 and 18 below the level of the water from the screen. In the side wall of the pit between partitions 11 and 12 an outlet 16 of fixed size is provided, leading to a box 19, connected to a pipe or conduit 20. Through the partition 12 there is an overflow opening 21 leading to a space between partitions 12 and 13. This overflow is placed at a level above the opening 16. Partitions 13, 14 and 15 are provided with depressed openings 22 at their alternate ends similar to those in partitions 10 and 11 so that the water will flow in a deviated course through the canals, formed by these partitions, toward the outlet 23. The overflow outlet 23, at a level slightly below opening 21, connects to a box 23' having connection to the sewer 24.

A second pit in a convenient position is divided into chambers 25, 26 and 27, each chamber preferably of progressively increasing size. The conduit 20 leads from the pit 6 to the chamber 25.

Downwardly extending baffles 28 and 29 are placed in pit 25 having openings 30 at their alternate ends, slightly below the water level. An opening 31 communicates from the chamber or pit 25 to pit 26 and an opening 32 from pit 26 to 27, the openings are at approximately the same level as the inlet from the conduit 20. Pit 26 is provided with vertical partitions 33 which extend and terminate below the water level, forming canals communicating by depressions at their alternate ends so that the water flows through the canals consecutively and in a deflected course from the inlet 31 to the outlet 32. Pit 27 is provided with similar vertical partitions 34. Attached to these partitions 34 are members 35 having their surfaces inclined to the vertical partitions 34 forming V shaped troughs in the canals formed by the partitions, with a continuous slot or opening 36 at the bottom of the V. At the intercommunicating ends of the canals there are inclined members 37 of the same section as 35 so that the V shaped trough with the slot 36 is carried continuously around the end of the partitions. Pit 26 is provided with the same construction of inclined members 35 and slots 36. An opening 38 diagonally opposite to and approximately at the same level as opening 32, is provided at the top of chamber 27 discharging into box 38', having communication to the sewer 24'. In each of the pits or chambers the usual form of air lift pump 39, 40, 41 and 42 is provided having air line connections as well as a water agitating line, which for the sake of clearness are not shown on the drawings, these and the purposes thereof being fully described and illustrated in my Patent No. 1,089,909. In pit 26 one of the partitions 33 is shortened and a cross partition 43 is put in to form a space for the air lift pump 41, similarly in pit 27 one of the partitions 34 is cut off and cross partition 44 is put in to provide a space for the pump 42.

The operation is as follows: The grinding table 1 is put in motion, fresh coarse sand is supplied to it by any suitable means. It may be deposited on the screen 5 and washed into pit 6 where it will settle and then be fed to the table by means of pump 39 or it may be delivered to the table directly from the bin placed above it, water being used to wash it down. As the table 1 revolves the sand is thrown off from it and is collected with the water in the ditch 2 and washed down through the canal 4 to the screen 5 aided by the water supply from the nozzles 7. The purpose of the screen 5 is to arrest particles of plaster, glass and foreign matter in the rough sand that may be supplied to the screen.

The sand carried by water which passes into the pit 6 through the screen 5 in the opening 8 is of varying degrees of coarseness, there being even in the original coarse sand a proportion of fine grains, the sand coming from the table is partially reduced in size and some of the grains pulverized. The water flows from the opening 8 to the outlet 16 through the canals formed by the partitions 10 and 11, passing through the openings in these partitions 17 and 18. During the course of the travel of the liquid the heavier grains of abrasive will fall out of suspension to the bottom of the pit. The partitions 10 and 11 extend downwardly a sufficient distance to prevent the water from passing down and under them from the opening 8 to the outlet 11 and are so proportioned that the path of least resistance is around the partitions and through the openings 17 and 18.

The outlet 16 is of fixed and limited area and so proportioned that the normal maximum flow water carrying abrasive will pass through it, and in case of a flood of water the outlet will be filled and the surplus pass through the opening 21 of the partition 12. The water carrying the finer abrasive from the outlet 16 will pass by means of the conduit 20 to the pit 25. The water entering pit 25 will pass around the partitions 28 and 29 through the openings 30 depositing the coarser abrasive in the bottom of the pit and carrying the finer grades through the opening 31 communicating to the pit 26.

From the opening 31 the water carrying abrasive passes along the first canal formed by the side of the chamber and the first partition 33 and flows through the V shaped trough whose sides are formed by the inclined members 35 and the water at rest in the lower portion of the pit. Thence it passes around the next partition and in a horizontally divergent course to the opening 32 communicating to the chamber or pit 27. In the course of the travel of the water the sand will have a tendency to deposit to the bottom of the V shaped troughs and will drop through the slot 36 in the bottom into the water at rest below the slot, only the finer grains of abrasive being carried forward. The pit 26 is made larger in cross sectional area than the pit 25 but smaller than the pit 27 and so proportioned that the sand will be correctly graded in the proper sizes to suit the progressive grinding operation. In pits 26 and 27 the total length of the canals is approximately the same but in pit 26 they are of smaller cross sectional area thus giving a swifter current than in those in pit 27, thus giving a greater carrying capacity and dropping out larger grains than will be deposited in pit 27. I may also increase the length of the canals in pit 27 by increasing the length of the pit thus giving a longer travel of the water carrying abrasive than in pit 26.

As the outlet 16 from pit 6 leading by the conduit 20 to pit 25 is limited in area and of fixed size a constant flow of water is maintained through the grading pits 25, 26 and 27 and through the various canals in these pits. The partitions 29, 33 and 36 in their respective pits are carried down to a sufficent depth so that the entering water carrying the abrasive will not short circuit across from the inlet of the grading chamber to the outlet or from one canal to another.

When sufficient grinding has been done by supplying the coarser grade of abrasive by means of the pump 39 from the pit 6, this is shut down and pump 40 started to supply the abrasive from pit 24. Successively the finer grades are supplied from pits 26 and 27.

During the operation of supplying fine sand by one of the pumps 40, 41 and 42 the whole of the water collected by the ditch 2 will still pass into the pit 6 through the screen 5 and the pump 9 being shut down, the whole of this water will have to pass out from this pit through its outlets. As the outlet 16 is limited in area leading to the fine sand grading pits, the surplus water passes through the opening 21, through partition 12 and thence passes through the canals formed by the partitions 13, 14 and 15 communicating at their ends by the opening 22 and thence out through the outlet 23 to the sewer 24. I might allow this overflow of sand and water to go directly to the sewer but by doing so would lose a large amount of good coarse sand suitable for grinding, it being an established fact that accumulated coarse abrasive still continues to come from the ditch for some time after the fine sand process has been started. By providing the extra partitions in pit 6 between the overflow 21 and the outlet 23, I retain this sand therein to be used in the next grinding operation.

Practical advantages of this form of apparatus are that the pits are conveniently placed to receive the abrasive and water from the grinding machine and that their construction is simple and operation reliable. In case of a pit of less depth using a motor driven centrifugal pump, trouble is sometimes experienced from the water getting into the pit in which the motor is placed, with the air lift pump there is no corresponding disadvantage. The air lift pump is a better form of supplying the abrasive to grinding machines as the sand causes excessive wear on the centrifugal pumps.

A further advantage is in the depths of these pits that give ample storage capacity for sand so that a supply of different grades can be carried over from one operation to the other, for in the case of the small boxes difficulty is experienced in getting a sufficient accumulation. The greater depth is also of advantage in that the sand deposits quicker and is not so much affected by the density of the mixture, whereas in a grading box of comparatively small depth the water will contain a large amount of sand in suspension through its body and its increased density will prevent additional sand from passing out of suspension toward the bottom of the box.

A further advantage is the accessibility to the top of the pit and the facility with which the arrangement of the partitions can be changed, partitions can be taken out or additional partitions put in or the size of the openings changed thus causing a more sluggish or fast flow of the sand and water as the case may be.

In the form of construction shown in this application, the slot at the bottom of the V is sufficiently small so that there is no tendency for the flow of water to disturb the body of water at rest underneath, but sufficiently large to allow the sand which falls out of suspension during the travel of the water to drop through into the quiescent water below. The partitions 34 are carried to a sufficient depth so that the frictional resistance of a flow of water passing under them will be greater than that produced by travel through the V shaped troughs from the inlet to the outlet of the grading pit, and so that the water will travel above through the V shaped troughs rather than under the partitions and through the pit of water below. In place of a continuous slot at the bottom of the V trough as specified I may use a series of holes or intermittent slots. I may also make only one V shaped trough connecting directly with the inlet and outlet of the pit instead of a series of connecting troughs with baffles as shown. It is understood that I may make these and other modifications without departing from the spirit of my invention, and I do not limit myself to the exact form of construction as shown.

I claim:

1. In an apparatus for supplying and grading abrading material to glass grinding machines, a preliminary grading pit, a conduit leading the abrasive and water from the grinding apparatus to the pit, an overflow from the pit to a sewer, an outlet from the top of the pit to a secondary grading pit, means for depositing the abrading material in the bottom of the pits, comprising downwardly extending cross partitions forming channels which open to a common chamber below the partitions through which the water and abrasive travel in a horizontal direction and through intercommunicating openings in their tops below the water level.

2. An apparatus for grading abrading material with water, comprising a tank having an inlet and an outlet respectively connected to each end of a V shaped trough partly below the water surface in the tank, a slot in the bottom of the V forming communication between the water traveling in the trough with the body of the water in the tank for the passage of part of the abrasive carried in suspension in the water, means for removing the deposited abrasive from the bottom of the tank.

3. An apparatus for grading abrading material with water, comprising a tank having an inlet and an outlet connected to each end of a series of continuously connected V shaped troughs partly below the water surface in the tank, a slot in the bottom of the V troughs forming communication with the water traveling in the troughs and the body of water in the tank for the passage of part of the abrasive carried in suspension in the water, partitions downwardly extending into the tank below the water surface forming baffles between the openings in the bottom of the respective slots in the troughs, means for removing the deposited abrasive from the bottom of the tank.

4. In an apparatus for supplying and grading abrading material to glass grinding machines, a preliminary grading pit, a conduit leading the abrasive and water from the grinding apparatus to a pit, an outlet of limited area from the top of the pit to a secondary grading pit, an overflow from the pit to a sewer, a secondary grading pit having a V shaped trough partly below the water surface in the pit, connected to the inlet from the preliminary grading pit, the other end connected to an outlet, a slot in the bottom of the V forming communication with the water traveling in the trough and the top of the water in the pit for the passage of part of the abrasive carried in suspension in the water, means for removing the deposited abrasive from the bottom of the pits.

5. In an apparatus for supplying and grading abrading material, a preliminary grading pit having means for separating out the coarser portions of the material to be graded, said pit having a waste overflow at its upper portion and an outlet of restricted area at a lower level than the overflow, a secondary grading pit connected to said overflow, said secondary pit having a substantially horizontal flow channel which is partly below the water level in said pit, said channel having a sand escape opening in its bottom, substantially as described.

6. In an apparatus for grading abrading material with water, a series of pits connected together by conduits for the passage of water carrying the abrading material, and having therein flow channels which are above and in partially separated communication with water and abrasive-collecting chambers in the pit below said channels, substantially as described.

7. In an apparatus for grading abrading material with water, a series of pits connected together by conduits for the passage of water carrying the abrading material, and having therein flow channels which are above and in partially separated communication with water and abrasive-collecting chambers in the pit below said channels, said channels being of progressively increasing cross sectional area, substantially as described.

8. In an apparatus for grading abrading material with water, a series of pits connected together by conduits for the passage of water carrying the abrading material, and having therein flow channels which are above and in partially separated communication with water and abrasive-collecting chambers in the pit below said channels, said channels being of progressively increasing cross sectional area, and the said channels being of greater length in some of the pits than in the others, substantially as described.

9. In an apparatus for grading abrading material with water, a receptacle having a lower water and abrasive chamber, and having substantially horizontal flow channels arranged in its upper portion, said channels having restricted openings which communicate with said chamber, substantially as described.

10. In an apparatus for grading abrasive material with water, a receptacle having a lower water and abrasive chamber, and having substantially horizontal flow channels arranged in its upper portion, said channels having restricted openings which communicate with said chamber, and the lateral walls of said channels extending downwardly into said chamber to points below the bottoms of said openings, substantially as described.

JAMES W. CRUIKSHANK.